United States Patent
Barnes et al.

(10) Patent No.: US 9,920,781 B2
(45) Date of Patent: Mar. 20, 2018

(54) DRY GLAZE SYSTEM

(71) Applicant: TREX COMMERCIAL PRODUCTS, INC., Winchester, VA (US)

(72) Inventors: Tony James Barnes, Robbinsdale, MN (US); Chad Elliott Berseth, New Brighton, MN (US); Christopher Jon Altringer, Circle Pines, MN (US); Scott Thomas Vandenberg, Minneapolis, MN (US); Jonathan Matthew Chase, White Bear Lake, MN (US)

(73) Assignee: TREX Commercial Products, Inc., Winchester, VA (US)

( * ) Notice: Subject to any disclaimer, the term of this patent is extended or adjusted under 35 U.S.C. 154(b) by 0 days.

(21) Appl. No.: 15/247,368

(22) Filed: Aug. 25, 2016

(65) Prior Publication Data

US 2017/0058928 A1   Mar. 2, 2017

Related U.S. Application Data

(60) Provisional application No. 62/209,745, filed on Aug. 25, 2015.

(51) Int. Cl.
| | |
|---|---|
| *A47K 1/00* | (2006.01) |
| *F16B 5/06* | (2006.01) |
| *E04F 11/18* | (2006.01) |
| *F16B 2/06* | (2006.01) |

(52) U.S. Cl.
CPC ........ *F16B 5/0614* (2013.01); *E04F 11/1812* (2013.01); *E04F 11/1853* (2013.01); *F16B 2/065* (2013.01)

(58) Field of Classification Search
CPC .............. E04B 2/96; E04B 2/88; F16B 45/02
See application file for complete search history.

(56) References Cited

U.S. PATENT DOCUMENTS

| | | | | |
|---|---|---|---|---|
| 4,418,506 | A * | 12/1983 | Weber | ..................... E04B 2/967 52/204.593 |
| 9,068,347 | B2 * | 6/2015 | Moeller | .................... E04B 2/88 |
| 9,598,893 | B2 * | 3/2017 | Vandervelden | ....... E06B 3/5409 |
| 2011/0239560 | A1 * | 10/2011 | Landeros | ................ E06B 3/305 52/204.61 |

\* cited by examiner

*Primary Examiner* — Amy J. Sterling
(74) *Attorney, Agent, or Firm* — McNees Wallace & Nurick LLC

(57) ABSTRACT

A system comprises a set piece, a threaded block, and a nut and is configured to support a panel in a railing system. The set piece comprises a block portion and a base portion. The block portion has a first planar surface and an opposing, second planar surface. The base portion is planar and extends from an edge of the block portion substantially perpendicular to the first and second surfaces of the block portion and away from the first surface of the block portion. The threaded block comprises a base and an extended circular portion. The circular portion comprises a threaded surface on the circumference, and the threaded block is configured to align with the set piece. The nut is configured to engage the threaded block. The nut comprises a corresponding threaded internal circular surface to rotatably engage the extended circular portion and move orthogonal to the threaded block base.

15 Claims, 5 Drawing Sheets

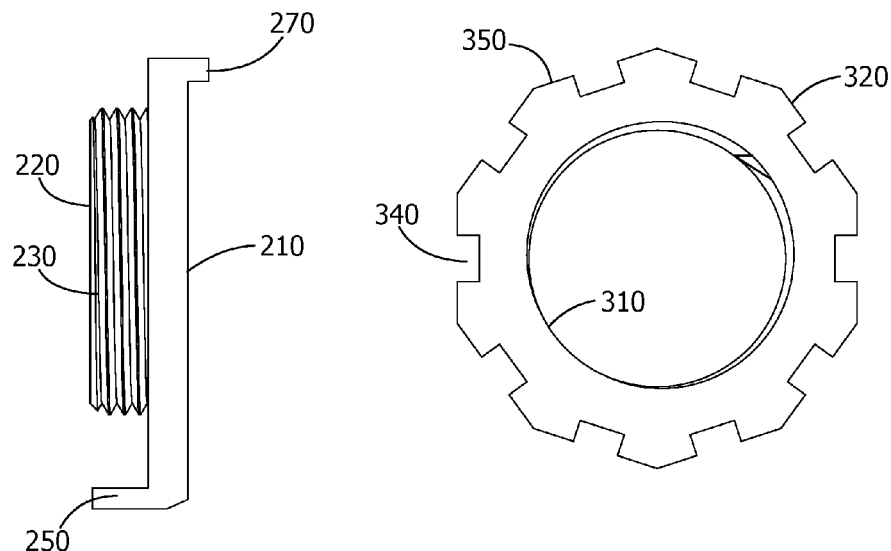
FIG. 2
FIG. 3
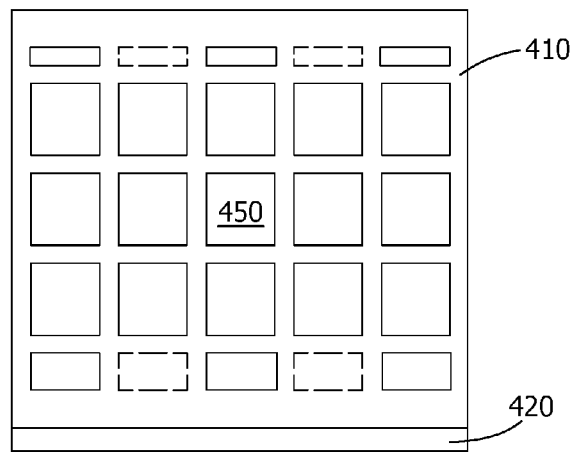
FIG. 4

DRY GLAZE SYSTEM

RELATED PATENT DOCUMENTS

This application claims the benefit of provisional Patent Application Ser. No. 62/209,745 filed on Aug. 25, 2015, to which priority is claimed pursuant to 35 U.S.C. § 119(e) and which is hereby incorporated herein by reference in its entirety.

FIELD

The present invention is directed to dry glazing systems. More particularly, the present invention relates to dry glazing systems for use in railing systems.

BACKGROUND

Railing systems frequently utilize panels, such as infill panels as support or for safety measures. Dry glazing refers to the installation of such panels without the use of putties or other types of grout. Dry glazing systems can utilize fewer tools, parts, and power sources than wet glazing systems. Moreover, dry glazing systems allow for adjustability of the panels and removal, e.g., de-installation, of the panels without damaging the panels. This can be especially useful when the railing system design involves complicated alignment and/or when the panels are made of special, or transparent, materials such as glass.

SUMMARY

Embodiments of the present invention provide an alternative to wet glazing, e.g. using grout, to secure railing panel sections. The described dry glazing systems can be erected with the use of minimal tools and use minimal components. The embodiments provide for flexible adjustment of modular components and are readily reconfigurable and customizable.

In one embodiment a system comprises a set piece, a threaded block, and a nut. The set piece comprises a block portion and a base portion. The block portion has a first substantially planar surface and an opposing, second substantially planar surface. The base portion is substantially planar and extends from an edge of the block portion substantially perpendicular to the first and second surfaces of the block portion and away from the first surface of the block portion. The threaded block comprises a base and an extended circular portion comprising a threaded surface on the circumference of the extended circular portion. The threaded block is configured to align with the set piece. The nut is configured to engage the threaded block. The nut comprises a corresponding threaded internal circular surface to rotatably engage the extended circular portion and move in a direction orthogonal to the base of the threaded block.

In another embodiment, a system comprises an elongated U-shaped base, a set piece, a threaded block, a nut, and a panel. The elongated U-shaped base has a first sidewall and an opposing second sidewall. The set piece comprises a block portion and a base portion. The block portion has a first substantially planar surface and an opposing, second substantially planar surface. The base portion is substantially planar and extends from an edge of the block portion substantially perpendicular to the first and second surfaces of the block portion and away from the first surface of the block portion. The set piece is configured to be inserted in the U-shaped base against the first sidewall. The threaded block comprises a base and an extended circular portion. The circular portion comprises a threaded surface on its external circumference. The threaded block is configured to be inserted in the U-shaped base against the second sidewall and to align with the set piece. The nut is configured to engage the threaded block. The nut comprises a corresponding threaded internal circular surface to rotatably engage the extended circular portion and move in a direction orthogonal to the base of the threaded block. The panel is positioned in the U-shaped base and supported between the set piece and the nut.

A further embodiment involves a method. The method comprises providing an elongated U-shaped base having a first sidewall and an opposing second sidewall. A set piece is inserted in the elongated U-shaped base. The set piece comprises a block portion and a base portion. The block portion has a first substantially planar surface and an opposing second substantially planar surface. The base portion is substantially planar and extends from an edge of the block portion substantially perpendicular to the first and second surfaces of the block portion and away from the first surface of the block portion. Inserting the set piece includes positioning the second surface of the block portion substantially flush against the first sidewall. Next, a panel is inserted in the elongated U-shaped base between the set piece and the second sidewall. A threaded piece is inserted between the panel and the second sidewall opposite the set piece. The threaded piece comprises a nut engaged with an extended, threaded circular portion of the threaded piece. The nut is then rotated to contact the panel.

These and various other advantages and features of novelty are pointed out with particularity in the claims annexed hereto and form a part hereof. However, for a better understanding of the disclosure and its advantages, reference should be made to the drawings which form a further part hereof, and to accompanying descriptive matter, in which there are illustrated and described representative examples of apparatuses, systems, and methods in accordance with the disclosure.

BRIEF DESCRIPTION OF THE DRAWINGS

FIG. 2 is a side view of a threaded block of the dry glaze system of FIG. 1;

FIG. 3 is a front view of a nut of the dry glaze system of FIG. 1;

FIG. 4 is a cross-sectional view of a set piece of the dry glaze system of FIG. 1;

DETAILED DESCRIPTION

In the following description of various exemplary embodiments, reference is made to the accompanying drawings that form a part hereof, and in which is shown by way of illustration various embodiments in which the disclosure may be practiced. It is to be understood that other embodiments may be utilized, as structural and operational changes may be made without departing from the scope of the present disclosure.

In accordance with various embodiments, a panel is installed using a dry glaze system for use in a railing system. In certain embodiments the panel is a glass panel, as part of a glass railing system, installed with compressive support elements and without the use of grout. The dry glaze systems described herein facilitate positioning of panels in a railing system with minimal or no damage to the panel surfaces. Thus, the panels can also be removed from the railing system easily without damaging the panels. Moreover, the dry glaze systems described are installed with a minimal number of tools, e.g., one wrench for rotating a nut.

Figure 1:
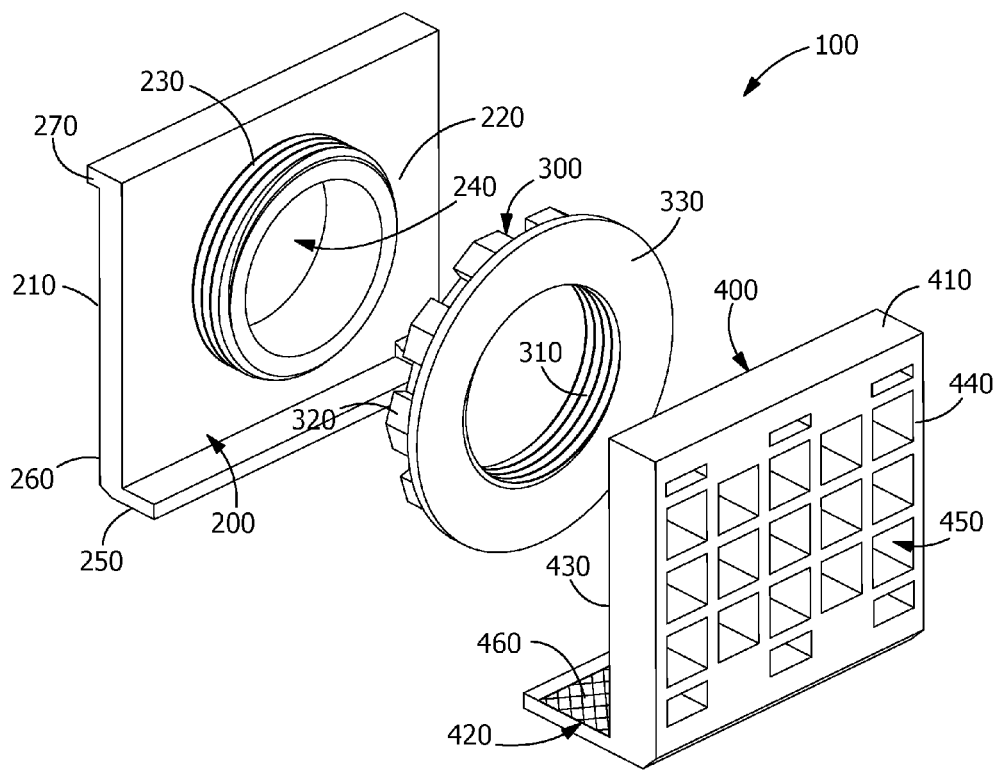
FIG. 1 is an exploded view of dry glaze system components according to example embodiments.

Turning to FIG. 1, components of a dry glaze system 100 are illustrated. The components include a threaded block 200, a nut 300, and a set piece 400. The components may be inserted in a base, or shoe, to compressively support a panel between the nut 300 and the set piece 400. Alternatively, the threaded block 200 and set piece 400 may attach directly to a substrate, or base surface, and may comprise a unitary element.

The threaded block 200 includes a base portion 210 and an extended circular portion 220. The extended circular portion 220 has a threaded surface on the exterior circumferential surface 230. The interior of the extended circular portion 220 may be an aperture 240, e.g., void of material. The circular portion 220 extends orthogonal to the base portion 210. The threaded block 200 can also include alignment features such as legs 260 and/or tabs 250. The tabs 250 extend from the base portion 210 in the same direction as the extended circular portion 220, with a tab 250 at each end of the threaded block 200. Alternatively, the tabs may be omitted and legs 260 may be used for alignment with a set piece where a portion of the set piece fits between, or is received by, the legs 260 and/or tabs 250. While the tabs 250 and/or legs 260 support the threaded block 200 when placed in a base, or shoe, the threaded block may also include a ledge 270. The ledge extends away from the base portion 210 in the direction opposite from the extended circular portion 220. Ledge 270 can engage with a groove along the length of a base, e.g., U-shaped base, to position and support the threaded block 200 in the base. FIG. 2 provides a side view of the threaded block 200 including extended circular portion 220, tab 250, and ledge 270.

The nut 300 is configured to engage the extended circular portion 220 of the threaded block 200. The nut 300 includes an interior, circular, threaded surface 310 corresponding to the threads of the exterior circumferential surface 230 of the threaded block's extended circular portion 220. Thus, the nut 300 can engage the threaded block 200 by rotating around the extended circular portion 220 and moving orthogonal to the base portion 210, e.g., screwing the nut 300 onto the threaded block 200. While the exterior circumferential surface 320 of the nut 300 is shown as also being largely circular, the exterior surface 320 can be any variety of shapes so long as the shape facilitates rotation of the nut 300 on the threaded block 200. As shown, the shape of the exterior surface 320 is contoured to facilitate rotation of the nut 300 with a tool such as a wrench or torque wrench. FIG. 3 provides an example configuration of the contouring in a front view of the nut 300. In certain embodiments, the contouring can include alternating notches 340 and ridges 350. Further, at least one side of the nut 300 has a planar surface 330. The planar surface 330 contacts the panel to compressively support the panel in the dry glaze system without damaging the panel.

Providing support for a panel from the opposing side is the set piece 400. The set piece 400 includes a block portion 410 and a base portion 420. The block portion has a first substantially planar surface 430 and an opposing, second substantially planar surface 440. The base portion 420 is substantially planar and extends from an edge of the block portion substantially perpendicular to the first and second surfaces 430, 440 and away from the first surface 430 of the block portion 410. The base portion 420 and block portion 410 may be integral to each other or connected in a variety of manners, e.g., hinged, glued, soldered or combinations thereof. The base portion 420 may optionally include an adhesive strip 460. Since a panel rests on the base portion 420, an adhesive strip 460 may enhance alignment and support of the panel. The base portion 420 also aligns the set piece 400 with the threaded block 200. The base portion 420 fits between the legs 260 and/or tabs 250 of the threaded block 200 to align the two components. Also, as shown in the cross-section of FIG. 4, the block portion 410 can include a plurality of voids 450 or other surface designs such as alternating grooves and ridges along the length of the block portion 410. The voids 450 and/or other surface designs can reduce the amount of material for the block portion 410, which can reduce production costs and the weight of the set piece 400. Since a plurality of the above-described systems 100 are typically used to install panels in a railing system, such costs and weight can impact an overall railing system project. The dashed lines indicate optional, additional apertures that may be formed in the block portion 410.

The components of FIGS. 1-4 can be made of any variety of materials. For example, the threaded block 200 and the nut 300 can comprise plastic such as PET, PBT, polyacrylamide, glass, metal, nylon, and any combination thereof including an aluminum-nylon hybrid. The set piece 400 can also comprise any variety of materials such as plastic, glass, metal, nylon, and any combination thereof including an aluminum-nylon hybrid.

Figure 5:
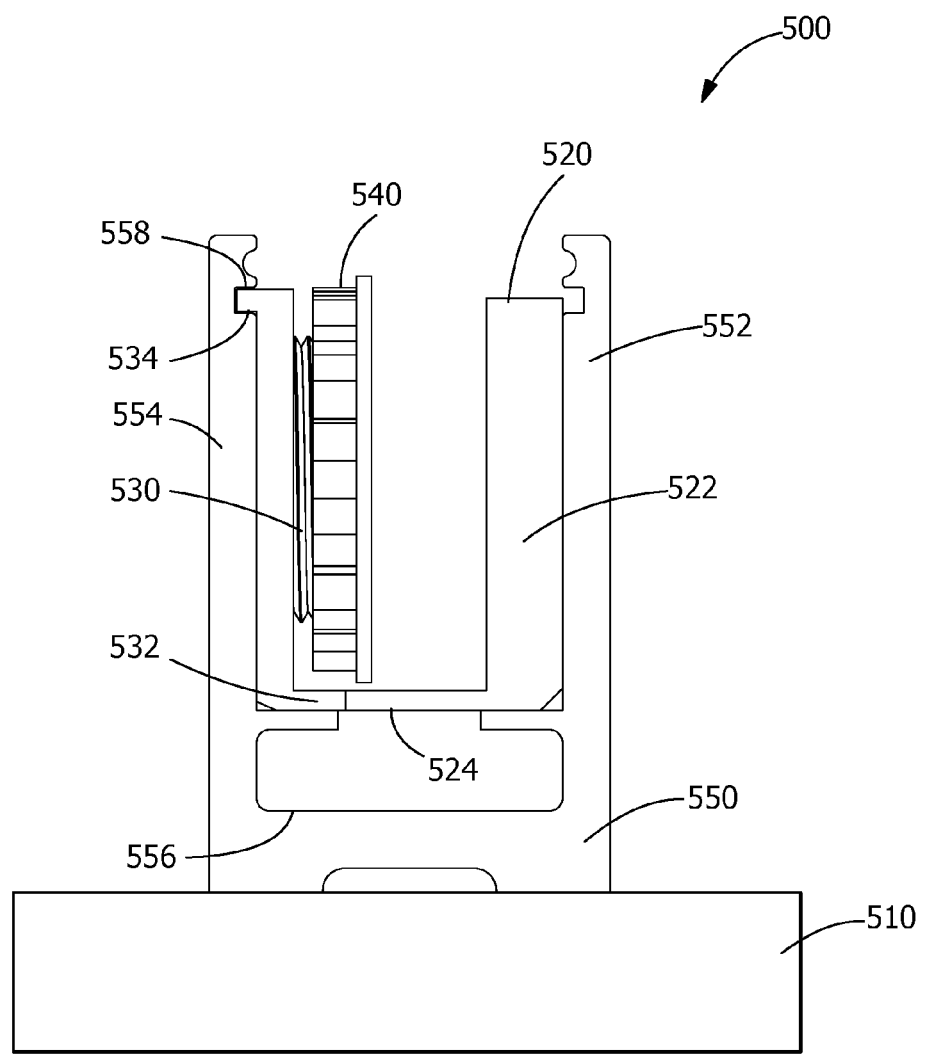
FIG. 5 is an end view of a dry glaze system, without a panel inserted, according to example embodiments.

In certain embodiments, a dry glaze system includes a base (e.g., a shoe or a channel) containing the components described above to facilitate clamping a panel in place. FIG. 5 illustrates the above-described components as a dry glaze system 500 positioned in a base 550. The base 550 can be an elongated U-shaped base having a first sidewall 552 and an opposing second sidewall 554. The base 550 can be any variety of shapes and sizes so long as it forms a general U-shape to receive the dry glaze system components. While the base 550 can comprise any variety of materials such as metal, plastic, ceramic, wood, and any combination thereof, the base 550 typically comprises an extruded aluminum U-shaped shoe.

As described above, a set piece 520 comprising a block portion 522 and a base portion 524 is configured to be inserted in the U-shaped base 550 against the first sidewall 552. As may be seen, the base portion 524 can form a "false" floor of the channel created by the U-shaped base 550 as there is a cavity formed between the bottom of the base portion 524 and the floor of the U-shaped base 556. A threaded block 530 is configured to be inserted in the U-shaped base 550 against the second sidewall 554 and to align with the set piece 520. Tab 532 receives the set piece base portion 524 by fitting/sliding along the outer edge of the set piece base portion 524 to align the two components. A second tab mirroring tab 532 at the other side of the threaded block can slide along the other end of the base portion 524 to enhance the alignment. The base 550 can also include a groove 558 extending along the length of the second (and/or first) sidewall. A ledge 534 of the threaded block 530 can engage the groove 558 to facilitate positioning of the threaded block 530, increase the vertical support for the threaded block 530, and/or to enhance alignment with the set piece 520. A portion of the set piece 520 can also be configured to engage a groove in the first sidewall 552. Inserting the set piece 520 or threaded block 530 can involve inserting one or both of the components at an open end of the base 550, engaging one or both of the grooves 558, and sliding the component(s) along the length of the base's channel. Alternatively, inserting the components can involve placing the components in the base 550 through the open top at a desired position along the base 550. A nut 540 rotatably engages the threaded block 530 and moves in a direction orthogonal to the first and second sidewalls 552, 554 of the U-shaped base 550. The system 500 is illustrated without a panel present.

Figure 6:
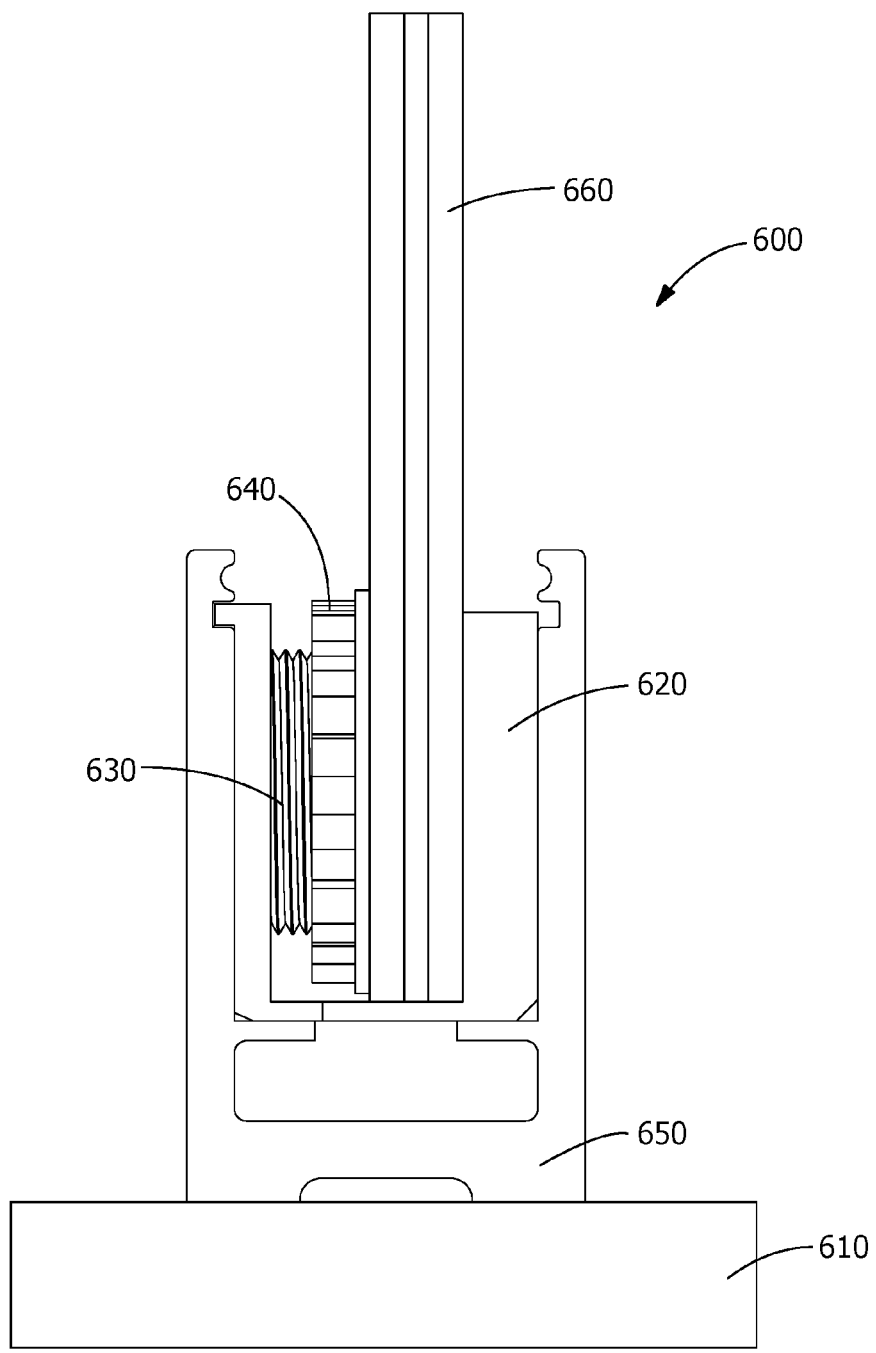
FIG. 6 is an end view of a dry glaze system, with a panel inserted, according to example embodiments.

Further embodiments, as illustrated in FIG. 6, involve a dry glaze system 600 with a panel 660 installed therein. Similar to FIG. 5, FIG. 6 shows a panel 660 positioned between the threaded block 630 and the set piece 620 and supported by rotating the nut 640 to compress the panel 660 against the set piece 620 in the base 650 anchored to a substrate 610. While the end view of FIG. 6 shows one set of dry glaze system components, a plurality of sets of components may be positioned along the length of the panel, or railing system, depending upon the length(s) and number of panels that constitute the railing system.

Figure 7:
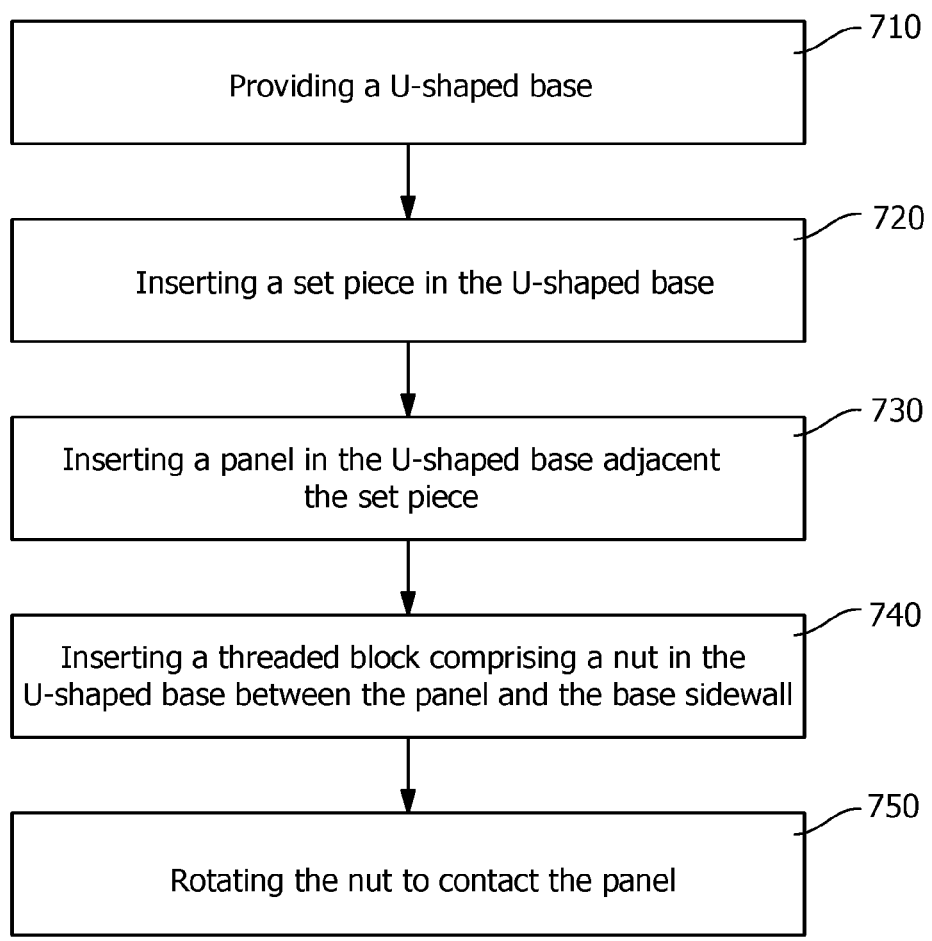
FIG. 7 is a flowchart of a method for assembling a dry glaze system according to example embodiments.

Further embodiments are directed to methods for installing a panel using a dry glaze system as set forth in FIG. 7. First, an elongated U-shaped base, such as a shoe, is provided 710. The base includes a first sidewall and an opposing second sidewall. The base typically extends the length of the panel, or plurality of panels, being installed. However, a plurality of bases, or shoes, can be combined to accommodate the installation length. Alternatively, a plurality of shoes having smaller lengths could be used at spaced-apart increments to support one or more panels. The base, or plurality of bases, is typically secured to a substrate. The substrate can include surfaces such as a staging platform, a building floor, a building ceiling, or other substantially planar surface.

Next, a set piece is inserted in the elongated U-shaped base 720. The set piece comprises a block portion and a base portion. The block portion has a first substantially planar surface and an opposing second substantially planar surface. The base portion is substantially planar and extends from an edge of the block portion substantially perpendicular to the first and second surfaces of the block portion and away from the first surface of the block portion. The set piece may optionally have an adhesive strip on the base portion extending the length of the block portion. If present, the backing of the adhesive strip could be removed prior to inserting the set piece in the base.

The set piece is inserted in the base such that the second surface of the block portion is positioned substantially flush against the first sidewall of the base. Depending on the shape of the U-shaped base, the set piece may rest on the bottom of the U-shaped base, or the set piece may rest on a ledge above the bottom of the U-shaped base, leaving space between the base of the set piece and the bottom of the channel formed by the U-shaped base. The number of set pieces inserted in a U-shaped base is determined by the length, weight, and/or quantity of panels to be installed. For example, the longer the panel, the more support and set pieces are required, but at least one set piece is typically provided per panel. The set pieces are inserted on the side of the base opposite the installation side. If more than one set piece is inserted, the set pieces are spaced apart to improve support for the panel. Depending on the size of the set pieces, they may be evenly spaced (e.g., for six inch block portions, the spacing could be at twelve inches from center to center or nine inches end-to-end).

Next, a panel is inserted in the elongated U-shaped base between the set piece(s) and the second sidewall of the base 730. The panel can be positioned so as to rest on the base portion of the set piece. If the set piece includes an adhesive strip, the panel would be positioned on the adhesive strip for enhanced support and alignment. The panel can also be positioned directly adjacent the set piece. The panel can comprise a variety of materials including metal, wood, fiber, acrylic, plastic, glass, or any combination thereof.

A threaded piece is then inserted between the panel and the second sidewall of the U-shaped base 740. The threaded piece comprises a nut engaged with an extended, threaded circular portion of the threaded piece. Prior to inserting the threaded piece, the nut should be positioned approximately flush with a base portion of the threaded piece. The threaded piece is inserted to be aligned opposite the set piece. For example, the threaded piece may have one or more alignment features, such as legs or tabs, which engage or receive the base of the set piece. Each set piece should have a corresponding threaded piece such that a plurality of threaded pieces are inserted if a plurality of set pieces are been used. The nut is positioned to move in a direction orthogonal to the first and second sidewalls of the U-shaped base.

Finally, the nut is rotated to contact the panel 750 and provide pressure to a first side of the panel while the support piece provides pressure to an opposing side of the panel. Typically, each of a plurality of threaded pieces is inserted prior to tightening each of the plurality of nuts. The nut may be rotated by hand, or by using a wrench such as a torque wrench designed for use with the nut. The thickness and/or length of the panel can affect the amount of torque applied to the nut (e.g., about 14-21 ft. lbs.). Optionally, a gasket may be placed on one or both sides of the panel and engaged with the base. Also, silicone may optionally be applied at the ends of the elongated base to secure the ends of the installation. While the figures illustrate installing the bottom of a panel with a dry glaze system, the system can also be used for installation at the top of a panel, along a side of a panel, or any combination thereof.

It is understood that railing systems mounted with dry glaze systems as discussed herein may be used with various accessories and devices. For example, railings, handles, lighting, and other accessories may also be suitably arranged at any desirable location on and along the panels. These railing systems may be utilized in a variety of venues including portable staging environments, buildings, and performance arenas.

The foregoing description of the exemplary embodiments of the disclosure has been presented for the purposes of illustration and description. It is not intended to be exhaustive or to limit the disclosure to the precise form disclosed. Many modifications and variations are possible in light of the above teaching. It is intended that the scope of the disclosure be limited not with this detailed description, but rather determined by the claims appended hereto.

That which is claimed is:

1. A system comprising:
 a set piece comprising a block portion and a base portion, the block portion having a first substantially planar surface and an opposing, second substantially planar surface and the base portion being substantially planar and extending from an edge of the block portion substantially perpendicular to the first and second surfaces of the block portion and away from the first surface of the block portion;

a threaded block comprising a base and an extended circular portion comprising a threaded surface on the circumference of the extended circular portion, the threaded block configured to align with the set piece; and a nut configured to engage the threaded block, the nut comprising a corresponding threaded internal circular surface to rotatably engage the extended circular portion and move in a direction orthogonal to the base of the threaded block;

wherein the threaded block further comprises a first tab and a second tab extending orthogonally from the base, wherein the first and second tabs are configured to receive the base portion of the set piece.

2. The system of claim 1, wherein the first and second tabs extend from the base of the threaded block in the same direction as the circular portion.

3. The system of claim 1, further comprising an elongated U-shaped base having a first sidewall and an opposing second sidewall, wherein the second surface of the set piece block portion is configured to be inserted in the U-shaped base against the first sidewall and the threaded block base is configured to be inserted in the U-shaped base against the second sidewall.

4. The system of claim 3, wherein the U-shaped base is an extruded aluminum shoe.

5. The system of claim 3, wherein the U-shaped base comprises a groove extending along the second sidewall and the threaded block base comprises an extended portion on a surface opposing the surface comprising the extended circular portion, wherein the extended portion is configured to engage the groove.

6. The system of claim 1, wherein the nut comprises a contoured external circumference opposing the threaded internal circular surface, the contoured external circumference configured to further enable rotation of the nut.

7. The system of claim 1, wherein the block portion of the set piece comprises a plurality of apertures.

8. The system of claim 1, wherein a panel is supported between the set piece and the nut.

9. The system of claim 8, wherein the panel comprises glass.

10. A system comprising:

an elongated U-shaped base having a first sidewall and an opposing second sidewall; a set piece comprising a block portion and a base portion, the block portion having a first substantially planar surface and an opposing, second substantially planar surface and the base portion being substantially planar and extending from an edge of the block portion substantially perpendicular to the first and second surfaces of the block portion and away from the first surface of the block portion, wherein the set piece is configured to be inserted in the U-shaped base against the first sidewall;

a threaded block comprising a base and an extended circular portion comprising a threaded surface on the circumference of the extended circular portion, the threaded block configured to be inserted in the U-shaped base against the second sidewall and to align with the set piece;

a nut configured to engage the threaded block, the nut comprising a corresponding threaded internal circular surface to rotatably engage the extended circular portion and move in a direction orthogonal to the base of the threaded block; and a panel positioned in the U-shaped base and supported between the set piece and the nut;

wherein the threaded block further comprises a first tab and a second tab extending orthogonally from the base, wherein the first and second tabs are configured to receive the base portion of the set piece.

11. The system of claim 10, wherein the first and second tabs extend from the base of the threaded block in the same direction as the circular portion.

12. The system of claim 10, wherein the U-shaped base is an extruded aluminum shoe.

13. The system of claim 10, wherein the U-shaped base comprises a groove extending along the second sidewall and the threaded block base comprises an extended portion on a surface opposing the surface comprising the extended circular portion, wherein the extended portion is configured to engage the groove.

14. The system of claim 10, wherein the block portion of the set piece comprises a plurality of apertures.

15. The system of claim 10, wherein the panel comprises glass.

* * * * *